United States Patent [19]

Hono et al.

[11] Patent Number: 4,685,113
[45] Date of Patent: Aug. 4, 1987

[54] DRIVER ISOLATING CIRCUIT FOR COMMON BUS-TYPE TRANSMISSION OF LOCAL AREA NETWORK

[75] Inventors: Susumu Hono, Amagasaki; Ichiro Okuda, Kobe; Hiroshi Ishihara, Mino; Masahiko Hori, Itami, all of Japan

[73] Assignee: Mitsubishi Cable Industries, Ltd., Hyogo-ken, Japan

[21] Appl. No.: 785,516

[22] Filed: Oct. 8, 1985

[30] Foreign Application Priority Data

Nov. 9, 1984 [JP] Japan ................ 59-236950

[51] Int. Cl.⁴ .............................................. H02H 3/08
[52] U.S. Cl. ........................................ 375/7; 375/36; 361/86; 361/98
[58] Field of Search ............ 361/55, 56, 86, 88; 375/7, 36; 370/85; 455/117, 58; 340/825.16; 178/69 R, 69 G

[56] References Cited

U.S. PATENT DOCUMENTS

| | | | |
|---|---|---|---|
| 3,931,547 | 1/1976 | Glogolia | 361/86 |
| 3,938,008 | 2/1976 | Knepper et al. | 361/98 |
| 4,276,442 | 6/1981 | Ienaka et al. | 361/88 |
| 4,384,363 | 5/1983 | Lipcon | 455/78 |

Primary Examiner—Benedict V. Safourek
Attorney, Agent, or Firm—Birch, Stewart, Kolasch & Birch

[57] ABSTRACT

A driver in a transceiver for a common bus-type transmission system of a local area network includes a switching transistor for receiving a transmission data signal from a station and outputting a forward data signal to a bus, a diode for stopping data entry from a bus to the switching transistor, a first data detection circuit for detecting the presence of the transmission data signal, a second data detection circuit for detecting the presence of the forward data signal, a determination circuit for detecting the occurrence of the short circuit of either one of the switching transistor and the diode, and a controller for controlling the conduction between the switching transistor and the bus.

6 Claims, 3 Drawing Figures

DRIVER ISOLATING CIRCUIT FOR COMMON BUS-TYPE TRANSMISSION OF LOCAL AREA NETWORK

BACKGROUND OF THE INVENTION

The present invention relates to a common bus-type transmission system of a local area network (LAN) and, more particularly, a driver isolating circuit for a common bus-type transmission system such that when a driver of a transceiver connected to a bus short-circuits, the driver isolating circuit permits the driver to be automatically isolated from the bus.

FIG. 2 shows a block diagram of a typical common bus-type transmission system of a local area network (LAN). It comprises a bus 2 composed of a coaxial cable and a plurality of stations 4 and transceivers 1. Each of the plurality of stations 4 is coupled to the bus 2 through each of the plurality of transceivers 1 which acts as the interface for each statin. Every transceiver 1 comprises a receiver 3 and a driver 5 connected in parallel with the bus 2.

FIG. 3 shows a block diagram of the conventional transceiver 1. The driver 5 comprises a transistor 6 as a switching element, a diode 7 connected between the collector of the transistor 6 and the bus 2, and a resistance 8 for applying a reverse-bias to the diode 7. When transmission data signals from the station 4 are inputted into the base of the transistor 6, the collector and the emitter of the transistor 6 become conductive so that currents can flow into the bus 2 to thereby induce negative voltage signals corresponding to the transmission data signals onto the bus 2. The negative voltage signals can be forwarded to the bus 2 as forward data signals in the form of the negative logic given by reversing the transmission data signals from the station 4.

It is now assumed that the transistor 6 as the switching element short-circuits due to lightning for example and the driver 5 of the troubled transistor 6 is positioned at A of FIG. 2. When the transmission data signals are inputted into the transistor 6 of the driver 5 positioned at N of FIG. 2, the transistor 6 becomes conductive. However, since negative currents have already flown from the short-circuiting transistor 6 of the driver 5 at the A position into the bus 2, the short-circuiting current and the transmission data signals are superposed on the bus 2. The correct transmission data signals from the driver 5 at the N position cannot be detected.

In particular, when the maximum transmission delay time (a time necessary for the signal transmission between the furthest two stations 4) is sufficiently greater than the bit rate, a reflection obstacle occurs on the bus 2 that causes echo noises.

If the diode 7 short-circuits in the driver 5, a similar problem may arise. Although the OFF resistance of the transistor 6 is set comparatively high, the resistance 8 for voltage drop is inserted in parallel with the bus 2, so that the reflections obstacle occurs also on the bus 2 to cause the echo noises.

Thus, the short-circuiting of either the switching element or the diode in one of the drivers damages the data transmission between the all stations in the transmission system.

SUMMARY OF THE INVENTION

Accordingly, it is an object of the present invention to eliminate the above problems and provide an improved transceiver of a local area network (LAN) for detecting the occurence of the short-circuiting of a circuit element and automatically, isolating the related driver from a bus, thereby preventing the interruption between the other stations to improve the reliability of the transmission system.

It is another object of the present invention to provide an improved transceiver of a local area network comprising a driver isolating circuit for detecting the occurrence of the short-circuiting of a switching element and a diode, and automatically isolating the related driver from a bus.

Other objects and further scope of applicability of the present invention will become apparent from the detailed description given hereinafter. It should be understood, however, that the detailed decription and specific examples, while indicating a preferred embodiment of the invention, are given by way of illustration only, since various changes and modifications within the spirit and scope of the invention will become apparent to those skilled in the art from this detailed description.

To achieve the above objects, pursuant to an embodiment of the present invention, a driver in a transceiver for a common bus-type transmission system of a local area network comprises switching means for receiving a transmission data signal from a station and outputting a forward data signal to a bus, diode means connected to the output terminal of the switching means for stopping data entry from the bus, first data detection means connected to the input side of the switching means for detecting the presence of the transmission data signal, second data detection means connected to the output side of the switching means and the diode means for detecting the presence of the forward data signal, determination means responsive to the first and the second data detection means for determining the occurrence of a short circuit of either the switching means or the diode means, and control means responsive to the determination means for controlling the conduction between the switching means and the bus.

Preferably, the first and the second data detection means comprises a mono-stable multivibrator or a low pass filter, and the control means comprises a mechanical or electronic switch.

BRIEF DESCRIPTION OF THE DRAWINGS

The present invention will become more fully understood from the detailed description given hereinbelow and the accompanying drawings which are given by way of illustration only, and thus are not imitative of the present invention and wherein.

DESCRIPTION OF THE PREFERRED EMBODIMENT

Figure 1:
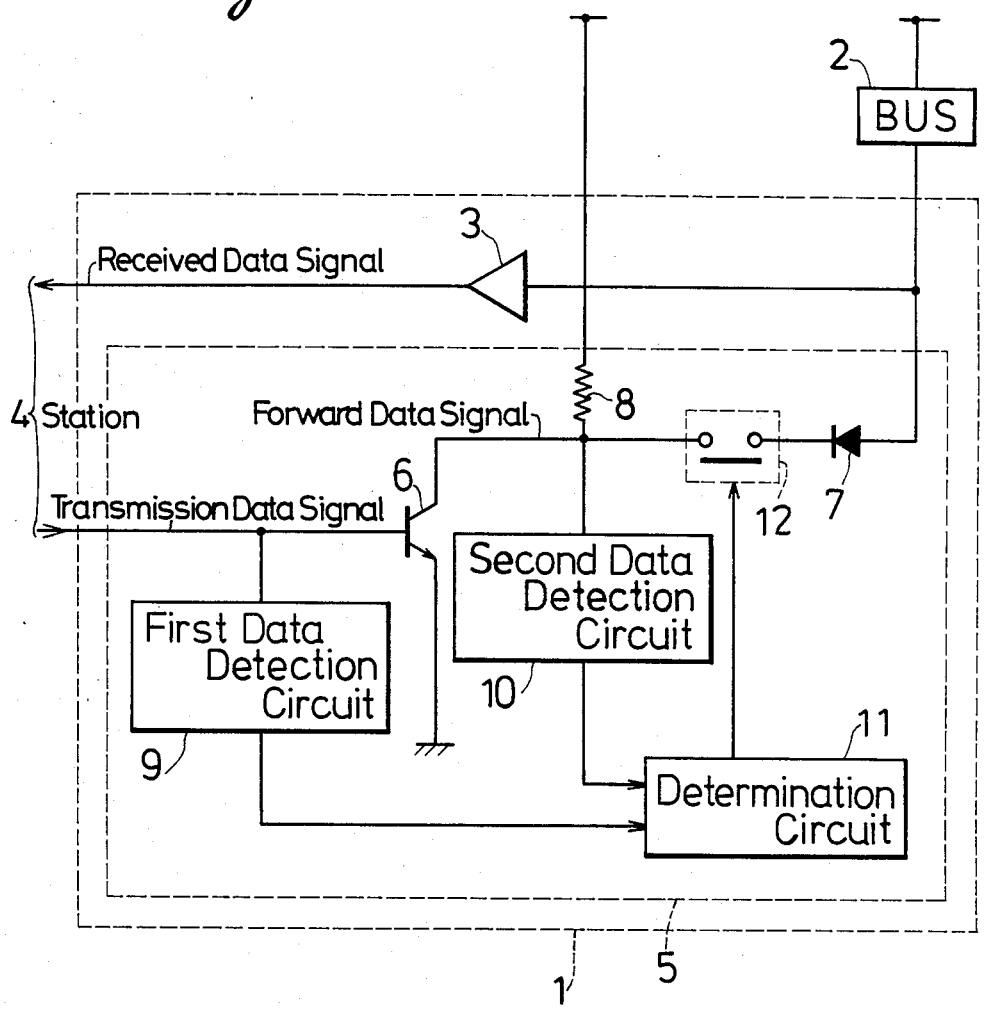
FIG. 1 is a block diagram of a transceiver comprising a driver isolating circuit according to the present invention.
Figure 2:
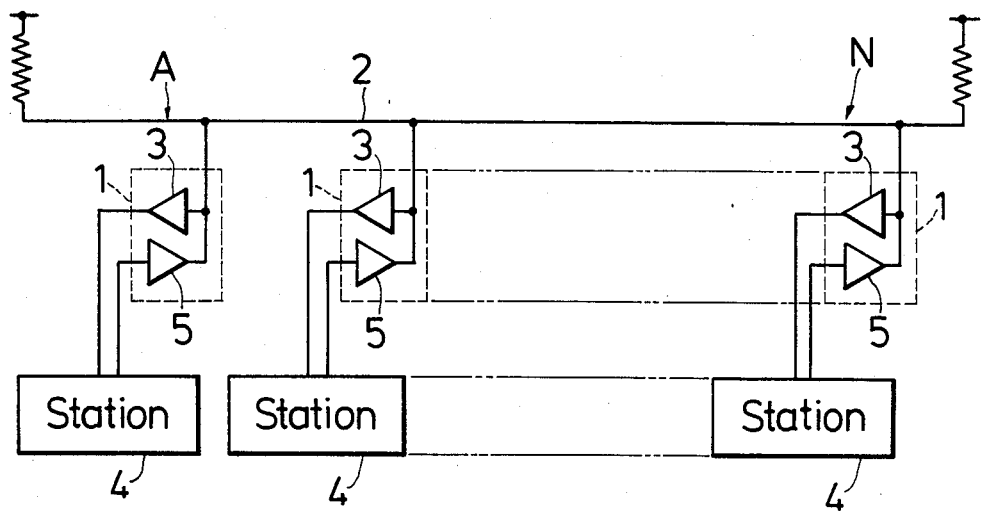
FIG. 2 is a block diagram of a typical common bus-type transmission system of a local area network (LAN)
Figure 3:
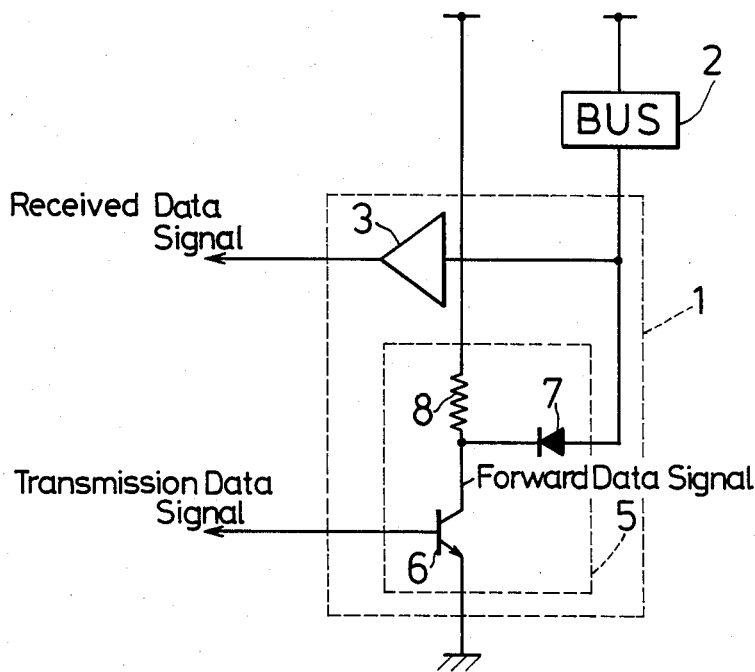
FIG. 3 is a block diagram of the conventional transceiver.

The common bus-type transmission system as shown in FIG. 2 comprises a transceiver of the present invention. FIG. 1 shows a transceiver 1 comprising a driver isolating circuit for a common bus-type transmission system of a local area network (LAN) according to the present invention. The transceiver 1 comprises a receiver 3 for receiving data signals carried on a bus 2, and a driver 5 for transmitting transmission data signals from a station 4 into the bus 2. The driver 5 is provided with a transistor 6 as a switching element, a diode 7 connected across the collector of the transistor 6 for outputting the data and the bus 2, a resistance 8 connected to the collector of the transistor 6 for a voltage drop. The transistor 6 is responsive to the transmission data signals inputted from the station 4 for outputting forward data signals corresponding to the transmission data signals. The diode 7 is responsive to the reverse bias applied through the resistance 8 for stopping the received data signals from the bus. The driver 5 further comprises a first data detection circuit 9 connected to the base of the transistor 6 for detecting the presence of the transmission data signals into the base side, a second data detection circuit 10 connected to the collector of the transistor 6, for outputting the forward data signals, and the diode 7 for detecting the presence of the forward data signals at the connection, a determination circuit 11 responsive to the detection signals from the first data detection circuit 9 and the second data detection circuit 10 for determining the occurrence of a short circuit of either the transistor 6 or the diode 7, and a switch 12 responsive to the determination output from the determination circuit 11 for switching the conduction between the collector of the transistor 6 and the bus 2.

Each of the first data detection circuit 9 and the second data detection circuit 10 preferably comprises a mono-stable multivibrator or a low pass filter, for example. The switch 12, coupled to the bus 2 and the collector of the transistor 6 in series, may be a mechanical switch, an electronic switch that, or any other siwtch switches in responose to the external control signal produced by the determination circuit.

The operation of the transceiver 1 of FIG. 1 will be described. When the transistor 6 and the diode 7 do not short-circuit and the transmission data signals are inputted from the station 4 into the base of the transistor 6, the collector of the transistor 6 has the forward data signals as negative logic in the form of a reversal of the transmission data signals. Therefore, the first data detection circuit 9 at the base of the transistor 6 can detect the presence of the transmission data signals and outputs the detection signal. The second data detection circuit 10 at the collector of the transistor 6 can detect the presence of the forward data signals of the negative logic and outputs the detection signal, too. When both of the data detection signals from the first data detection circuit 9 and the second data detection circuit 10 are present, the determination circuit 11 determines no occurrence of a short circuit of either the transistor 6 or the diode 7. During no occurrence of the short circuit, it is unnecessary to isolate the related driver 5 from the bus 2 so that, responsive to the determination signal of no occurrence of the short circuit, the switch 12 remains conductive.

When the transistor 6 and the diode 7 do not short-circuit and no transmission data signals are inputted from the station 4 into the base of the transistor 6, no forward data signals appear at the collector of the transistor 6. Here, the first data detection circuit 9 and the second data detection circuit 10 output the detection signals indicative of the absence of the transmission and forward data signals, respectively.

Even when the data signals to be transmitted are absent, because the receiver 3 and the driver 5 are commonly coupled to the bus 2, the data signals from the other stations 4 possible invade not only the transmission line of the receiver 3 but also that of the driver 5 through the bus 2. However, such external data signals can be stopped from invading the transmission lines of the receiver 3 and the driver 5, by the reversed biased diode 7, so that, even if the external data signals are present, the second data detection circuit 10 outputs the detection signal. The determination circuit 11 is responsive to both of the detection signals indicative of the absence of the transmission and forward data signals, from the first data detection circuit 9 and the second data detection circuit 10, for determining no occurrence of the short circuit of either of the transistor 6 and the diode 7. It is unnecessary to isolate the related driver 5 from the bus 2, so that responsive to the determination signal indicative of no occurrence of the short circuit, the switch 12 remains conductive.

When the transistor 6 short-circuits, the collector voltage of the transistor 6 is changed low even if the transmission data signals are not inputted into the base of the transistor 6, so that a current can pass through the diode 7. The second data detection circuit 10 outputs its detection signal indicative of the presence of the forward data signals. At the same time, the first data detection circuit 9 outputs its detection signal indicative of the absence of the transmission data signals. When the detection signal of the first data detection circuit 9 is different from that of the second data detection circuit 10, the determination circuit 11 determines the occurrence of the short circuit of either the transistor 6 or the diode 7 and outputs its determination signal corresponding to the determination. When the short circuit of either the transistor 6 or the diode 7 occurs, the data transmission between the other stations 4 of the network is obstructed. To avoid this obstruction of data, responsive to the determination signal of the occurrence of the short circuits, the switch 12 is switched nonconductive so that the whole of the related driver 5 is isolated from the bus 2.

When the diode 7 short-circuits, the collector side of the transistor 6 bears the data signal from the other stations 4 through the short-circuiting diode 7, which is detected by the second data detection circuit 10. Even if the transmission data signals from the related station 4 are not inputted into the input side of the transistor 6 and the first data detection circuit 9 cannot detect the presence of the transmission data signals, the second data detetion circuit 10 can detect the data signal from the other stations 4. Thus, the detection signal of the first data detection circuit 9 is different from that of the second data detection circuit 10 in that the former indicates the absence of the transmission data signals and the latter the presence of the forward data signals.

The determination circuit 11 outputs its determination signal indicative of the occurrence of the short circuit of either the transistor 6 or the diode 7. In accordance with the determination signal, the switch 12 is switched nonconductive, so that the whole of the driver 5 is isolated from the bus 2.

TABLE I

| Detection Signal of First Data Detection Circuit | Detection Signal of Second Data Detection Circuit | Short Circuit | Switch |
|---|---|---|---|
| 1. Data Presence | Data Presence | No | Conductive |
| 2. Data Absence | Data Absence | No | Conductive |
| 3. Data Absence | Data Presence | Yes | Non- |

TABLE I-continued

| Detection Signal of First Data Detection Circuit | Detection Signal of Second Data Detection Circuit | Short Circuit Switch |
|---|---|---|
| | | Conductive |

1: Neither of the transistor 6 and the diode 7 short-circuits. The transmission data signals are inputted into the transistor 6.
2: Neither of the transistor 6 and the diode 7 short-circuits. The transmission data signals are not inputted into the transistor 6.
3: Either of the transistor 6 and the diode 7 short-circuits.

As described above, in accordance with the present invention, the short circuit of either the transistor 6 or the diode 7 causes the related driver to be automatically isolated from the bus 2 by detecting the short circuit. There is no fear that the short circuit accident in one of the drivers damages the data transmission of the other stations. The interruption of entire transmission system due to a short circuit accident in one of the drivers can be avoided, thereby improving the reliability of the transmission system.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A driver transceiver for a common bus-type transmission system of a local area network comprising:
   switching means for receiving a transmission data signal from a station and outputting a forward data signal to a bus;
   diode means connected to an output terminal of said switching means for stopping data entry from the bus to said switching means;
   first data detection means connected to an input side of said switching means for detecting the presence of the transmission data signal;
   second data detection means connected to said output terminal of said switching means and said diode means for detecting the presence of the forward data signal;
   determination means responsive to said first and said second data detection means for determining whether either one of said switching means and said diode means short-circuits and
   control means, responsive to said determination means, for controlling the conduction between said switching means and the bus such that said switching means has no conduction path to said bus if either said switching means or diode means short-circuits.

2. The driver according to claim 1, wherein said determination means determines the occurrence of the short circuit of either one of said switching means and said diode means based on a condition that the detection signal of said first data detection means is different from that of said second data detection means.

3. The driver according to claim 1, wherein said switching means comprises a transistor.

4. The driver according to claim 1, wherein at least one of said first and said second data detection means comprises a mono-stable multivibrator.

5. The driver according to claim 1, wherein said control means comprises a mechanical switch or an electronic switch.

6. The driver according to claim 1 wherein at least one of said first and second data detection means comprise a low pass filter.

* * * * *